United States Patent
Burger et al.

(10) Patent No.: US 12,370,028 B2
(45) Date of Patent: Jul. 29, 2025

(54) METHOD OF PLANNING FREE-FORM TOOL PATHS FOR SIMULTANEOUS TWO-SIDED MACHINING WITH KINEMATIC AXIS COUPLING

(71) Applicants: DENTSPLY SIRONA Inc., York, PA (US); SIRONA DENTAL SYSTEMS GMBH, Bensheim (DE)

(72) Inventors: Peter Burger, Bensheim (DE); Oliver Nowarra, Leimen (DE)

(73) Assignee: Dentsply Sirona Inc., York, PA (US)

( * ) Notice: Subject to any disclaimer, the term of this patent is extended or adjusted under 35 U.S.C. 154(b) by 471 days.

(21) Appl. No.: 17/640,938

(22) PCT Filed: Sep. 21, 2020

(86) PCT No.: PCT/EP2020/076238
§ 371 (c)(1),
(2) Date: Mar. 7, 2022

(87) PCT Pub. No.: WO2021/058419
PCT Pub. Date: Apr. 1, 2021

(65) Prior Publication Data
US 2022/0331073 A1 Oct. 20, 2022

(30) Foreign Application Priority Data
Sep. 24, 2019 (EP) .................... 19199316

(51) Int. Cl.
*A61C 13/00* (2006.01)
*A61C 3/02* (2006.01)
(Continued)

(52) U.S. Cl.
CPC ............ *A61C 13/0004* (2013.01); *A61C 3/02* (2013.01); *A61C 13/0022* (2013.01); *B23Q 39/026* (2013.01); *B24B 27/0076* (2013.01)

(58) Field of Classification Search
CPC ... A61C 13/0004; A61C 3/02; A61C 13/0022; B23Q 39/026; B24B 27/0076
See application file for complete search history.

(56) References Cited

U.S. PATENT DOCUMENTS

| | | | |
|---|---|---|---|
| 6,394,880 B1 * | 5/2002 | Basler | ............... A61C 13/0003 451/28 |
| 2012/0087757 A1 | 4/2012 | Basler | |

(Continued)

FOREIGN PATENT DOCUMENTS

| | | |
|---|---|---|
| EP | 1060712 B1 | 5/2006 |
| JP | H11239950 A | 5/1989 |

(Continued)

OTHER PUBLICATIONS

English Translation of KR-101764176-B1 (Year: 2017).*
(Continued)

*Primary Examiner* — Charles R Kasenge
(74) *Attorney, Agent, or Firm* — SCHWEGMAN LUNDBERG & WOESSNER, P.A.

(57) ABSTRACT

A computer-implemented method of planning of the shapes of free-form tool paths (P) for simultaneous two-sided machining of a dental restoration (1) having an individual free-form target geometry from a workpiece (2) by using a dental tool machine (3) having at least two tool spindles each having at least one tool (4) arranged on a different side of the workpiece (2) which is simultaneously movable along an axis (y) relative to the tools (4) thereby imposing a kinematic axis coupling. The method includes a step of determining transformations (T', T") of the target geometry by which the kinematic axis coupling is converted into a common coupling parameter for both tools (4); and a step of generating dependent on these transformations (T', T") the shapes of the free-form tool paths (P) in which the common coupling (Continued)

parameter is identical in time for all participating tool spindles that are driven simultaneously.

10 Claims, 7 Drawing Sheets

(51) Int. Cl.
    *B23Q 39/02*     (2006.01)
    *B24B 27/00*     (2006.01)

(56) References Cited

U.S. PATENT DOCUMENTS

| | | | |
|---|---|---|---|
| 2014/0189991 | A1 | 7/2014 | Duncan |
| 2015/0328732 | A1 | 11/2015 | Uhlmann |
| 2020/0086447 | A1* | 3/2020 | Pham .................. B23Q 39/044 |

FOREIGN PATENT DOCUMENTS

| | | | | |
|---|---|---|---|---|
| JP | 2001001230 | A | | 1/2001 |
| JP | 2001025475 | A | | 1/2001 |
| JP | 2003186514 | A | | 7/2003 |
| JP | 2008509745 | A | | 4/2008 |
| JP | 2014121421 | A | | 7/2014 |
| JP | 2019520148 | A | | 7/2019 |
| KR | 100979695 | B1 | * | 9/2010 |
| KR | 101764176 | B1 | * | 8/2017 |
| KR | 1020180034896 | A | | 4/2018 |
| WO | WO-2010002058 | A1 | * | 1/2010 ......... A61C 13/0004 |

OTHER PUBLICATIONS

English Translation of "KR-100979695-B1" (Year: 2010).*
International Search Report; PCT/EP2020/076238; Nov. 12, 2020 (completed); Nov. 20, 2020 (mailed).
International Preliminary Report on Patentability; PCT/EP2020/076238; Nov. 12, 2020 (completed); Nov. 20, 2020 (mailed).
Written Opinion of the International Searching Authority; PCT/EP2020/076238; Nov. 12, 2020 (completed); Nov. 20, 2020 (mailed).
Japanese Office Action dated Aug. 20, 2024.

* cited by examiner

METHOD OF PLANNING FREE-FORM TOOL PATHS FOR SIMULTANEOUS TWO-SIDED MACHINING WITH KINEMATIC AXIS COUPLING

CROSS-REFERENCE TO RELATED APPLICATIONS

This is a National Phase application of International Application No. PCT/EP2020/076238, filed Sep. 21, 2020, which claims the benefit of and priority to European Application Ser. No. 19199316.1, filed on Sep. 24, 2019, which are herein incorporated by reference for all purposes.

TECHNICAL FIELD OF THE INVENTION

The present invention relates to a computer-implemented method of tool path planning for simultaneous two-sided machining of a dental restoration from a workpiece by using a double-spindle dental tool machine having a kinematic axis coupling for the workpiece which is relatively movable with respect to the tools.

BACKGROUND OF THE INVENTION

Single-spindle dental tool machines are commonly known in the art. In a single-spindle dental tool machine, the dental restoration is machined from a workpiece by using a single tool spindle having at least one dental tool which is driven sequentially along the tool paths. Due to the sequential processing, the completion of the machining process in a single-spindle dental tool machine takes a relatively long time.

Multi-spindle dental tool machines are also commonly known in the art. In a multi-spindle dental tool machine, the dental restoration is machined from a workpiece by using multiple tool spindles each having one or more dental tools on different sides of the workpiece which can be simultaneously driven along the tool paths. Therefore, the completion of the machining process in a multi-spindle dental tool machine generally takes a relatively short time. US2014/0189991A1 discloses a double-spindle dental tool machine wherein the tool spindles can be individually operated with three degrees of freedom. However, the mechanical construction and the operation of such a double-spindle dental tool machine is complicated due to the increased number of movable parts.

US2015/0328732A1 discloses a tool machine with one coupled axis and two individual tools being preferably opposite to each other. However, the rotating main spindle and limited movement along two axes result in circular tool paths which are independent of the machined object shape. Only the feed axis can be used to adapt the immersion depth of the tool to form free-form surfaces with the parametrically predefined paths. Thus, this prior art method generally reduces the choice of possible tool paths for simultaneous two-sided machining.

Another double-spindle dental tool machine having a kinematic axis coupling is disclosed in EP1060712B1 and U.S. Pat. No. 6,394,880B1. In these double-spindle dental tool machines, each tool spindle has one or more dental tools arranged on opposite sides of the workpiece which is simultaneously movable relative to the dental tools, thereby, imposing a kinematic axis coupling. Each tool spindle can be individually moved with two degrees of freedom, namely axially and rotationally relative to the workpiece. Thereby, the mechanical construction is simplified compared to double-spindle dental tool machines without kinematic axis coupling.

In the above-cited double-spindle dental tool machine having the kinematic axis coupling, the tool paths for simultaneous two-sided machining are typically planned through a method in which the coupled axis, i.e., the workpiece is moved in a form that is determined independently from the target geometry of the dental restoration. This form is further adaptable through parameters such as the starting/ending point and the density of the tool paths. The tool paths for simultaneous two-sided machining generated with this prior art method typically follow arc-shaped or circular paths. Thus, this prior art method generally reduces the choice of possible tool paths for simultaneous two-sided machining.

SUMMARY

An objective of the present invention is to overcome the problems of the above-mentioned prior art and to provide a computer-implemented method of planning the shapes of free-form tool paths for the simultaneous two-sided machining of a dental restoration having an individual free-form target geometry from a workpiece by using at least a double-spindle dental tool machine having a kinematic axis coupling for the workpiece which is relatively movable with respect to the tools.

This objective is achieved through the method as defined in claim 1, and the dental machining system as defined in claim 12. The subject-matters of the dependent claims relate to further developments.

The present invention provides a computer-implemented method of planning of the shapes of free-form tool paths for simultaneous two-sided machining of a dental restoration having an individual free-form target geometry from a workpiece by using a dental tool machine comprising at least two tool spindles each having at least one tool arranged on a different side of the workpiece which is simultaneously movable along an axis relative to the tools and thereby imposing a kinematic axis coupling. The method comprises a step of determining transformations of the target geometry by which the kinematic axis coupling is converted into a common coupling parameter for both tools; and a step of generating dependent on these transformations the shapes of the free-form tool paths in which the common coupling parameter is identical in time for all participating tool spindles that are driven simultaneously.

A major advantageous effect of the present invention is that it enables to generate free-form tool paths that conform to the individual free-form target geometry of the dental restoration. Another major advantageous effect of the present invention is that it enables to generate a larger variety of tool paths for the simultaneous two-sided machining in comparison to the prior art. Another major advantageous effect of the present invention is that it enables simultaneous two-sided machining with opposite tool spindle directions.

According to an embodiment of the present invention, the calibration of the dental tool machine is considered in the transformations when the coupled axis deviates from a reference position more than a desired accuracy. This is useful, for instance, when the dental tool machine has manufacturing tolerances. Similarly, the calibration of the dental tool machine is also considered in the transformations when the kinematic settings of at least one tool spindle is intentionally modified with respect to that of the other tool spindle. This is useful, for instance, when the home positions of the tool spindles are not exactly opposing each other but are offset, for instance, by an operator through an adjustment means.

According to an embodiment of the present invention, a mixing of the coupled axis with other degrees of freedom of the dental tool machine is separated if the other degrees of freedom are respectively different for the different tool spindles. A mixing is given, if the axes for one or more tools are not linearly independent. This separation is particularly useful when the dental tool machine has different constructional arrangement for different tool spindles.

According to an embodiment of the present invention, the free-form tool paths are generated to machine in slices with infeed of the workpiece along the coupled axis. The infeed can be adjusted for fast grinding and for fine grinding. The slices maybe arc-shaped such that they conform with the geometry of the tool spindle motion. Alternatively, the slices may be rectangular shaped such that they conform with the geometry of the workpiece.

According to an embodiment of the present invention, the free-form tool paths are generated to machine on or with an offset to the surface of the dental restoration. The distance between the tool paths may be static or dynamically adjustable. Thereby the target geometry of the dental restoration can be either entirely machined or partly machined and subjected to post-machining for finishing the target geometry.

According to an embodiment of the present invention, the free-form tool paths are generated to simultaneously machine along trochoidal paths. Thereby, the dental restoration can be more rapidly machined, thus the material can be removed from the workpiece more quickly.

According to an embodiment of the present invention, the free-form tool paths are generated to machine along contours on constant levels. The constant levels are preferably perpendicular to the tool axes. Alternatively, the constant levels may be preferably arranged relative to a direction that best conforms the target geometry. Thereby, the target geometry can be precisely machined, and the surface of the dental restoration can be smoothly finished.

According to an embodiment of the present invention, a collision between the tool spindles and the connected machine parts is avoided during the two-sided machining of the dental restoration. The collision avoidance can be achieved by one or various measures in combination. For instance, the free-form tool paths for simultaneous two-sided machining may be separated from each other by disjunctive machining spaces. For instance, the collision-afflicted and collision-free areas may be determined along the free-form tool paths. And the free-form tool paths may be synchronized in such a way that the collision-relevant machine parts are never moved simultaneously in the associated collision-afflicted areas. For instance, retraction movement along the tool axis may be performed on one or both tool axes to guide them past each other.

The present invention also provides a dental machining system which includes a multi-spindle dental tool machine, preferably a double-spindle tool machine. The multi-spindle dental tool machine has at least two tool spindles each having at least one tool arranged on a different side of a workpiece which is simultaneously movable along an axis relative to the tools and thereby imposing a kinematic axis coupling. The multi-spindle dental tool machine further includes a control means adapted to individually control drive of the tool spindles according to the method of the present invention.

According to an embodiment of the present invention, the two tool spindles are arranged on opposite sides of the workpiece. The two tool spindles oppose each other in the home position. Alternatively, the two tool spindles are offset in the home positions. The offset may be a fixed amount or adjustable.

The present invention also provides a computer-program for causing a computer based dental machining system to carry out the method of the present invention. The computer program has computer-readable codes. The computer-program may be provided on a computer-readable storage means which is internal or external to the dental machining system. The dental machining system may have a CAD/CAM module for executing the computer program.

BRIEF DESCRIPTION OF THE DRAWINGS

In the subsequent description further aspects and advantageous effects of the present invention will be described in more detail by using exemplary embodiments and by reference to the drawings, wherein FIG. 1—is schematic partial view of the kinematics of a dental tool machine according to an embodiment of the present invention.

DETAILED DESCRIPTION OF THE INVENTION

Figure 7A:
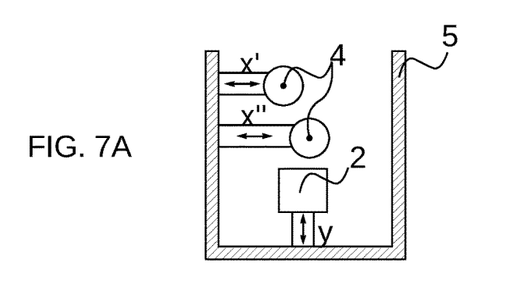
FIG. 7A—is a schematic view of the kinematics of a dental tool machine with orthogonal machine axis, including one coupled axis according to an embodiment of the present invention.

The reference numbers shown in the drawings denote the elements as listed below and will be referred to in the subsequent description of the exemplary embodiments:

1. Dental restoration
2. Workpiece
3. Dental tool machine
4. Dental tool
5. Stationary machine bed
P: Free-form tool path
y: Coupled axis of the workpiece
$y_t$: Common coupling parameter
z, z', z": Dental tool axis
$x'_t$, $x''_t$: Transformed machine axes
d', d": Offset of the rotation center
T', T": Transformation
c', c": Arc shaped axis O', O": Rotation center
r', r": Radius
t1, t2, t3, t4: Point of time
δ: Angle between coupled and non-coupled axes
Δ: Difference of position between desired system and actual/modified system FIG. 7A shows the kinematics of a dental tool machine (3) with orthogonal axes. The dental tool machine (3) comprises two tool spindles each having a dental tool (4). The tools (4) are arranged on opposite sides of a workpiece (2) which is simultaneously movable along the axis (y) relative to the tools (4). Thereby, the movable workpiece (2) imposes a kinematic axis coupling considering the two axes (x', x"), which cannot be independently moved relative to two axes (x', x") in direction of the coupled axis (y), but only simultaneously by the coupled axis. The tool spindles have tool motors which rotate the tools (4) respectively.

Figures 7B, 7C:
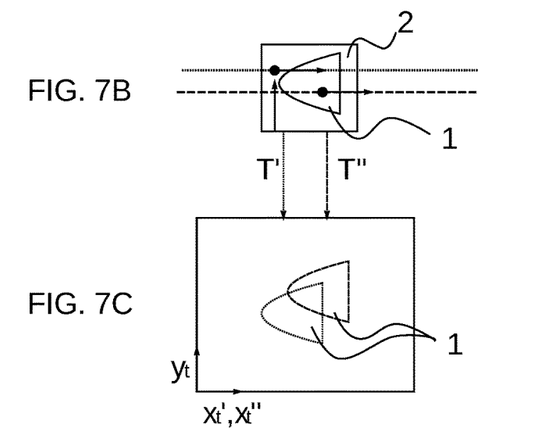
FIG. 7B—shows the paths (dashed/dotted horizontal lines) of the non-coupled axes through an exemplary restoration for a fixed position of the coupled axis for the machine shown in FIG. 7A.
FIG. 7C—visualizes the restoration transformed into a common space for both non-coupled axes considering the axis coupling for the kinematics, shown in FIG. 7A, and the restoration—shown in FIG. 7B—according to an embodiment of this invention.

In FIG. 7B an exemplary "D" shaped dental restoration (1) is visualized in the workpiece (2). For a fixed position of the coupled axis (y), the possible tool movements are shown by the dashed and dotted lines for the kinematics shown in FIG. 7A. In the coordinate space of the workpiece (2), the simultaneous tool paths cannot be adapted to the restoration (1) so that these follow free-form tool paths by applying prior art methods.

To create free-form tool paths being adapted to the restoration, including movement of the coupled axis, transformations are required. This is carried out separately for both tools (4) resulting in the transformations (T', T"), and a new coordinate space shown in FIG. 7C.

Within this transformed space, according to an embodiment of the present invention, for any given position of the common coupling parameter ($y_t$) both tools (4) can simultaneously reach all positions addressable by the transformed machine axes ($x'_t$, $x''_t$). In this specific case, shown in FIG. 7A, the transformations (T', T") describe the relation $(x'_t, y_t)$=T'(x', y), $(x''_t, y_t)$=T"(x", y) with e.g. T'(x', y)=$(x', y)^T$ and T"(x", y)=$(x", y+a)^T$.

Figure 7D:
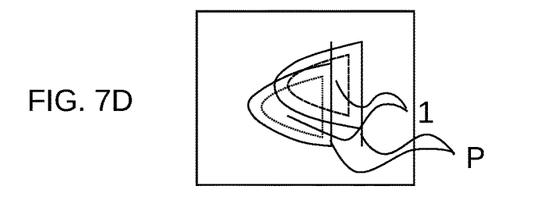
FIG. 7D—shows an exemplary free-form tool path, according to an embodiment of the present invention, surrounding the restoration for both non-coupled axes, which can be machined simultaneously and calculated in the space, shown in this figure.

An exemplary free-form tool path (P) around the dental restoration (1) for the scenario given in FIG. 7B is shown in FIG. 7D: Both tools (4) can continuously cut and do not need to be stopped or lifted at any given position. However, both free-form tool paths (P) must consider the coupling parameter ($y_t$), which must be identical for both tools (4) at each point in time. That is why both exemplary paths in FIG. 7D contain a compensation movement (both at the right side of the restoration), to cover the full range of the coupling parameter ($y_t$) required for both tools (4) to cover the whole restoration (1). That is why the compensation movement is for one tool (4) at the point with the smallest possible value of the coupling parameter ($y_t$) and ends at the smallest possible value of the coupling parameter ($y_t$) for the free-form tool path (P) of the other tool (4) and vice versa for the largest possible value of the coupling parameter ($y_t$).

Figure 8A:
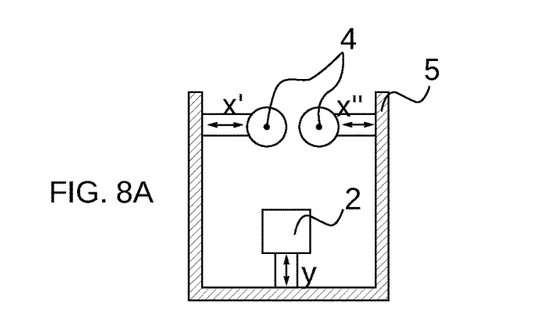
FIG. 8A—is a schematic view of the kinematics of a dental tool machine with orthogonal machine axis including one coupled axis where one of the non-coupled axes is intentionally modified in its direction and position compared to the kinematics shown in FIG. 7A.
Figure 8B:
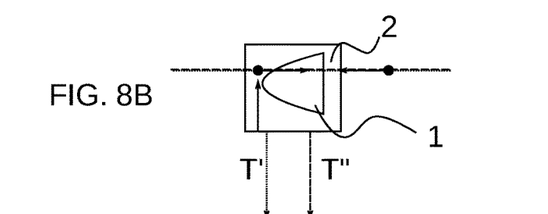
FIGS. 8B-D—show the resulting tool paths, a common space for the given restoration, and exemplary free-form tool paths generated for the kinematics shown in FIG. 8A according to an embodiment of the present invention.
Figure 8C:
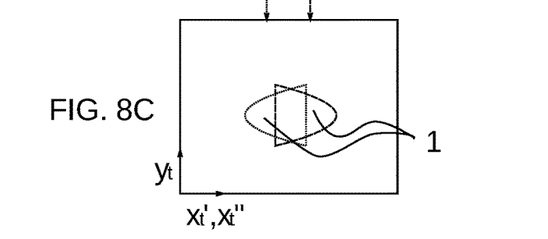
Figure 8D:
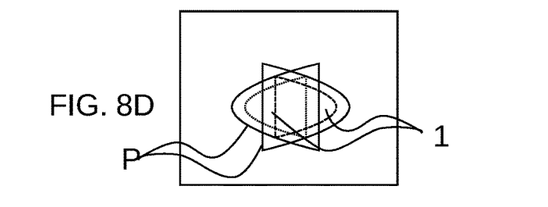

In FIG. 8A a different kinematics compared to the one from FIG. 7A is shown. In this case one of the non-coupled axes (x") is intentionally inverted. Therefore, the tools (4) cross the restoration at the same line for a fixed position of the coupled axis (y) and the restoration appears flipped in the transformed space shown in FIG. 8C. The transformations in this example can be described e.g. by T'(x', y)=$(x', y)^T$ and T"(x", y)=$(-x", y)^T$. The transformed shape of the restoration (1) covers the same range of the common coupling parameter ($y_t$) for both tools (4). In contrast to the setup shown in FIG. 7D, the resulting free-form paths in FIG. 8D do not require a compensation movement. In this setup, also a collision avoidance might be necessary, as both tools (4) can possibly collide.

Figure 9A:
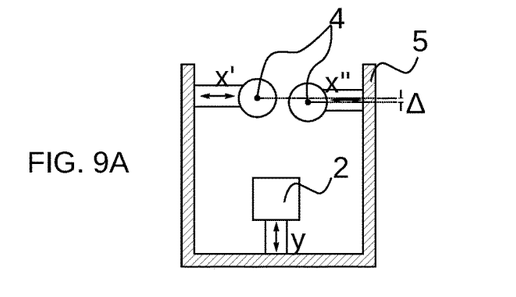
FIG. 9A—is a schematic view of the kinematics of a dental tool machine with orthogonal machine axes including one coupled axis where the position of one of the non-coupled axes is shifted or modified compared to the kinematics shown in FIG. 8A.
Figure 9B:
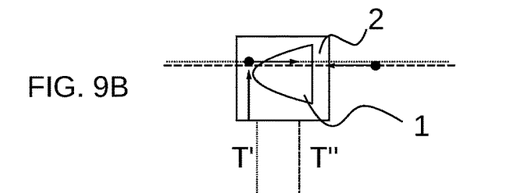
FIGS. 9B-D—show the resulting tool paths, a common space for the given restoration, and exemplary free-form tool paths generated for the kinematics shown in FIG. 9A according to an embodiment of the present invention.
Figure 9C:
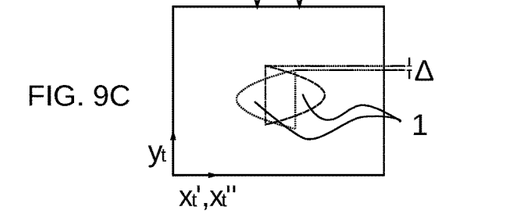
Figure 9D:
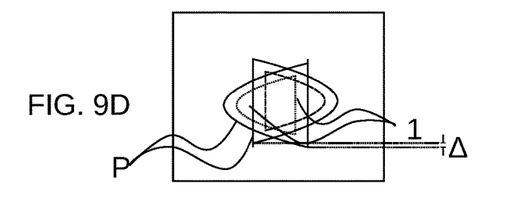

The kinematics shown in FIG. 9A is slightly different compared to the one from FIG. 8A. Beside any intentional modification also an unintentional difference (Δ) (such as a shift) of the axes' positions exceeding the desired accuracy is introduced. This can be induced by a limited precision in the manufacturing process of the dental tool machine (3). The resulting tool setup for a fixed position of the coupled axis (y) is shown in FIG. 9B. Transforming the restoration (1) shape into a space with a common coupling parameter ($y_t$) for both tools (4) results in shapes flipped and shifted by the difference (Δ), as visualized in FIG. 9C. Creating tool paths (P) in this space to surround the restoration shape leads e.g. to the free-form paths shown in FIG. 9D. These paths (P) require compensation movements (both at the right side of the restoration) for the difference (Δ). The transformations in this example can be described e.g. by $T'(x', y)=(x', y)^T$ and $T''(x', y)=(-x'', y+\Delta)^T$.

Figure 10A:
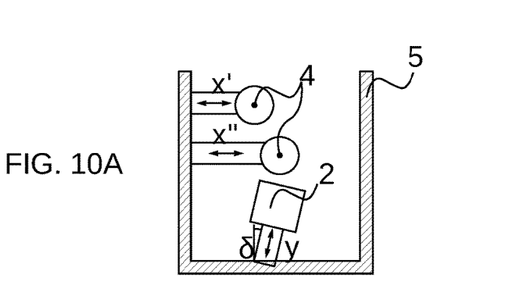
FIG. 10A—is a schematic view of the kinematics of a dental tool machine including one coupled axis where the coupled axis is non-orthogonal to the non-coupled axes FIG. 7A.
Figure 10B:
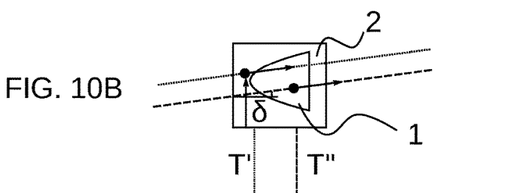
FIGS. 10B-D—show the resulting tool paths, a common space for the given restoration, and exemplary free-form tool paths generated for the kinematics shown in FIG. 10A according to an embodiment of the present invention.
Figure 10C:
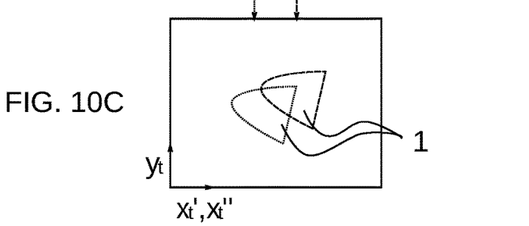
Figure 10D:
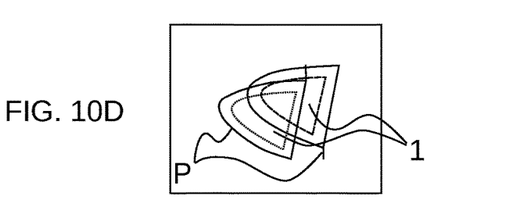

FIG. 10A shows a kinematics where the coupled axis (y) is tilted by the angle (δ), which results in a non-orthogonal system. For a given position of the coupled axis (y), the tools (4) can reach all positions on a line tilted by the angle (δ), as shown in FIG. 10B. In this space, the coupled axis (y) is mixed with the two uncoupled axes (x', x''). As a result, the transformations to a space which separates the mixing are e.g. given by $$T'(x',y)=(x'\cos(\delta)-y\sin(\delta), x'\sin(\delta)+y\cos(\delta))^T \text{ and}$$

$$T''(x'',y)=(x''\cos(\delta)-y\sin(\delta), x''\sin(\delta)+y\cos(\delta)+a)^T$$

Wherein e.g. a=Δ. The resulting space with the now tilted and shifted restoration shapes is shown in FIG. 10C. Exemplary free-form tool paths (P) created in this space are shown in FIG. 10D, which require compensation movements (both at the right side of the restoration).

Figure 11A:
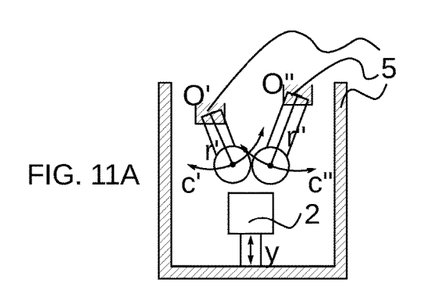
FIG. 11A—is a schematic view of the kinematics of a dental tool machine including one coupled axis which contains two rotational non-coupled axes resulting in arc shaped tool paths according to an embodiment of the present invention.
Figure 11B:
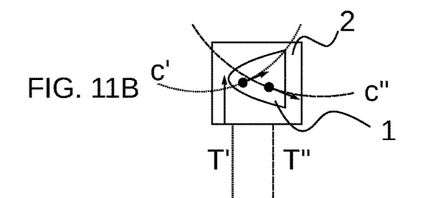
FIGS. 11B-D—show the resulting tool paths, a common space for the given restoration, and exemplary free-form tool paths generated for the kinematics shown in FIG. 11A according to an embodiment of the present invention.
Figure 11C:
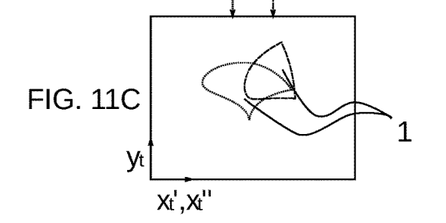
Figure 11D:
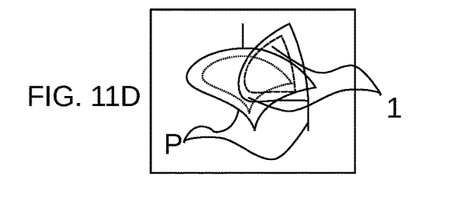

In contrast to the previously described machines, FIG. 11A shows a kinematics including two uncoupled rotational arms resulting in arc shaped axes (c', c'') with different radii (r', r''). The radii may be also the same. The rotation centers (O', O'') have intentionally different positions, which results in significantly different paths of the uncoupled axes (c', c''), shown in FIG. 11B. The rotation centers (O', O'') may be also coincident. The rotation centers (O', O'') may be also be adjustable in radial direction. A transformation, which results in a coupling parameter ($y_t$) separating the mixing of the arc shaped axes (c', c'') and the coupled axis (y) results in a space which distorts the restoration shape in an arc like shape. An exemplary result of such a transformation is shown in FIG. 11C. These non-linear transformations (x't, $y_t$)=T'(c', y), (x''t, $y_t$)=T''(c'', y) are given by the machine kinematics e.g. as shown in FIG. 11A. The resulting deformed free-form paths (P) are shown in FIG. 11D. To cover the whole range of the coupling parameter ($y_t$), the paths (P) for both tools (4) require compensation movements. In this case the movements are located on the right side for one tool, which is the lowest value of the coupling parameter ($y_t$) for this tool, and on the largest value of the coupling parameter ($y_t$) for the other tool, somewhere in the middle of the restoration.

Figure 1:
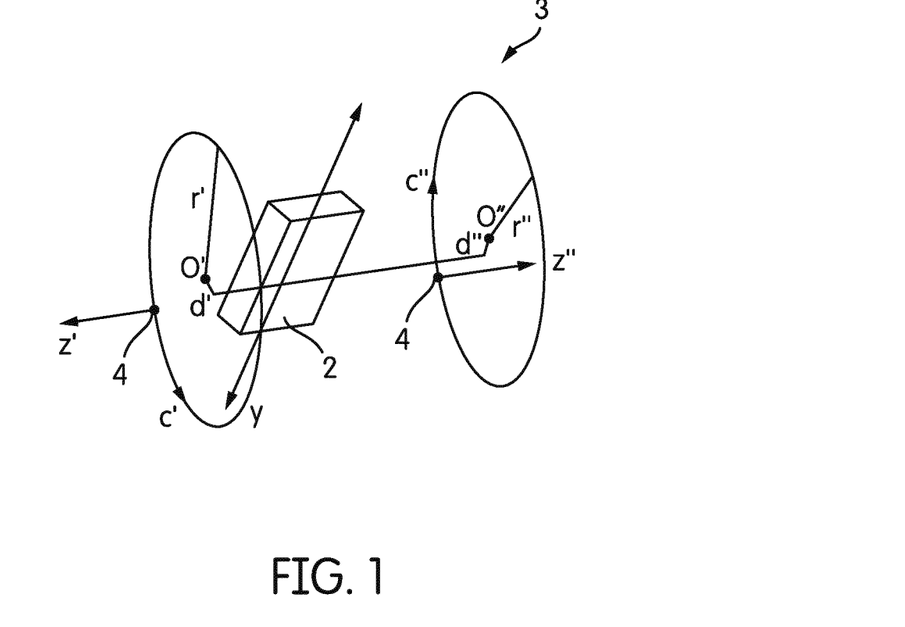

FIG. 1 shows the kinematics of a double-spindle dental tool machine (3) of the dental machining system according to an embodiment of the present invention. The dental tool machine (3) comprises two tool spindles each having a dental tool (4). The tools (4) are arranged on opposite sides of a workpiece (2) which is simultaneously movable along the axis (y) relative to the tools (4). Thereby, the movable workpiece (2) imposes a kinematic axis coupling for the two tool spindles. Each tool spindle can move the respective tool (4) independently along the respective arc-shaped axis (c', c'') around the respective rotation center (O', O') with the respective radius (r', r'') in either directions. The tool spindles have tool motors which rotate the tools (4) respectively. Each tool (4) of the respective tool spindle can be individually moved along the respective dental tool axis (z', z''). The workpiece (2) can be also rotated about the axis (y). The rotation centers (O', O'') are separated by offsets (d', d'') respectively which may differ through manufacturing tolerances or the construction. Similarly, the radius (r', r'') of the tool spindles may differ through manufacturing tolerances or the construction. On the other hand, there is a mixing of the tool (4) movement along the arc-shaped axes (c', c'') with the workpiece (2) movement along the axis (y) i.e., the arc-shaped axes (c', c'') are not linearly independent from coupling axis (y). This mixing is not necessarily identical on both machining sides if the tool spindle constructions are different. The dental tool machine (3) has a control means adapted to individually control drive of the tool spindles including the tool motors according to a method of the present invention which will be further described in the subsequent description.

The present invention provides a computer-implemented method of planning of the shapes of free-form tool paths (P) for simultaneous two-sided machining of a dental restoration (1) having an individual free-form target geometry from a workpiece (2) by using the dental tool machine (3).

Figure 2A:
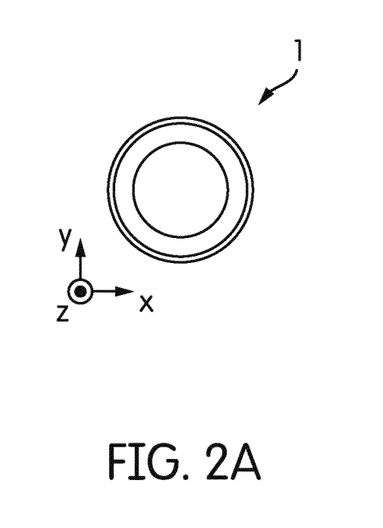
FIG. 2A—is schematic top view of a target geometry of a dental restoration according to an embodiment of the present invention.
Figure 2B:
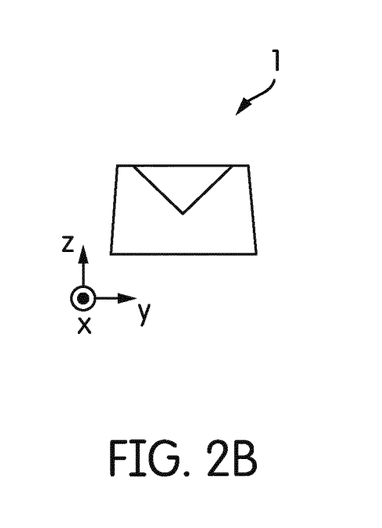
FIG. 2B—is schematic sectional view of the dental restoration of FIG. 2A.

FIG. 2A shows a schematic top view of a target geometry of a dental restoration (1). The target geometry in FIG. 2A corresponds to a truncated cone aligned along the dental tool axis (z) with a cut-out cone. The target geometry is held simple for ease of illustration. FIG. 2B shows a schematic sectional view of the target geometry of FIG. 2A. Later in the description, the tool paths (P) for the simultaneous two-sided machining will be illustrated with reference to the target geometry in FIG. 2A and FIG. 2B.

The method comprises: a step of determining transformations (T', T'') of the target geometry by which the kinematic axis coupling is converted into a common coupling parameter for both tools (4); and a step of generating dependent on these transformations (T', T'') the shapes of the free-form tool paths (P) in which the common coupling parameter is identical in time for all participating tool spindles that are driven simultaneously.

Figure 3A:
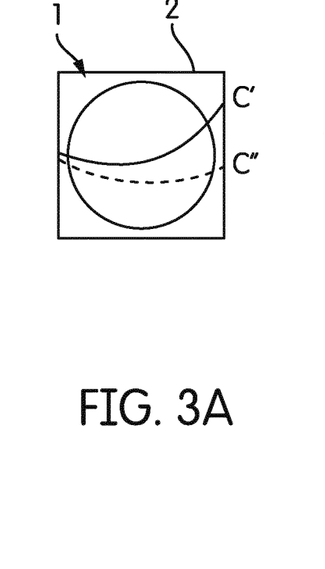
FIG. 3A-3D—are schematic views of transformations according to an embodiment of the present invention for the kinematics of the dental tool machine of FIG. 1.
Figure 3B:
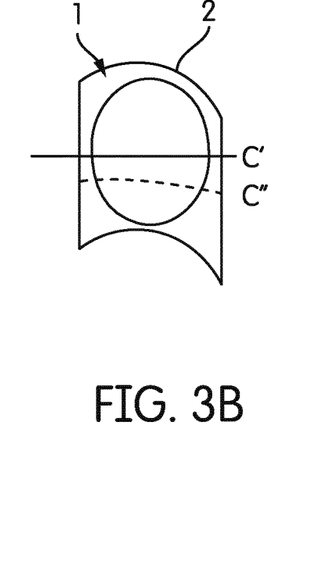
Figure 3C:
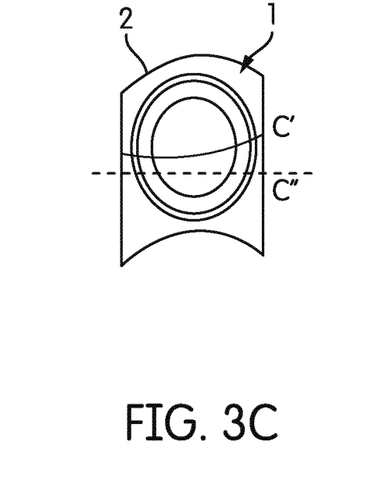
Figure 3D:
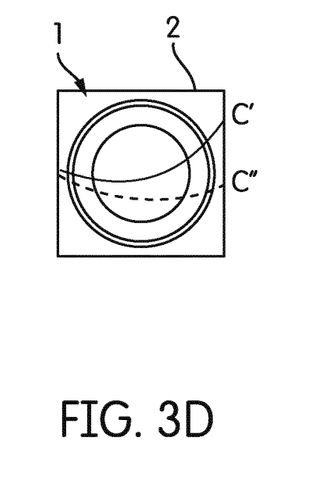

Exemplary transformations (T', T'') for converting the coupled axis (y) into a common space for both tool spindles could be to map the circular movement of the tools (4), namely the arc-shaped axes (c', c'') in a cartesian coordinate system onto a line. FIG. 3A-3D show schematic views of the transformations (T', T'') according to an embodiment for the kinematics of the dental tool machine (3) of FIG. 1. The common coupling parameter corresponds to the coupled axis (y) of the relatively movable workpiece (2) in the transformed common space. The offset (d', d'') of the rotation centers (O',O'') relative to each other and possible different radii (r', r'') of the tool path (P) must be considered in these transformations (T',T''). This procedure is shown in FIG. 3A-3D for a specific inclination of the coupled axis (y) of the workpiece (2). As shown in FIG. 3A to FIG. 3D, the dental restoration (1) is schematically shown inside the workpiece (2). In FIG. 3A and FIG. 3B, the dental restoration (1) is shown from the bottom direction of FIG. 2A. In FIG. 3C and FIG. 3D, the dental restoration (1) is shown from the top direction of FIG. 2A. The degree of freedom for a movement of the tool (4) along the arc shaped axis (c') is shown as a solid curve through the workpiece (2). The degree of freedom for a movement of the tool (4) along the arc shaped axis (c") is shown as a dashed curve through the workpiece (2). Due to the different offsets (d', d") and radii (r,' r") associated with the tools (4), the solid and dashed curves may not be coincident. FIG. 3B and FIG. 3C show the respective transformed target geometries. All points on both machining sides that can be reached in the coupled axis (y) lie on one line.

In an embodiment, the method further comprises: a step of considering the calibration of the dental tool machine (3) during the above-mentioned transformations (T', T"), if a deviation (δ) of the coupled axis (y) from a reference position/alignment e.g. as shown in FIG. 10A exceeds a desired accuracy or if the kinematic settings of at least one tool spindle is shifted (due to the manufacturing process) through an amount (Δ) e.g. as shown in FIG. 9A or intentionally modified with respect to that of the other tool spindle In an embodiment, the method further comprises: a step of separating mixings of the coupled axis (y) with other degrees of freedom of the dental tool machine (3) if the other degrees of freedom are respectively different for the different tool spindles.

Figure 4:
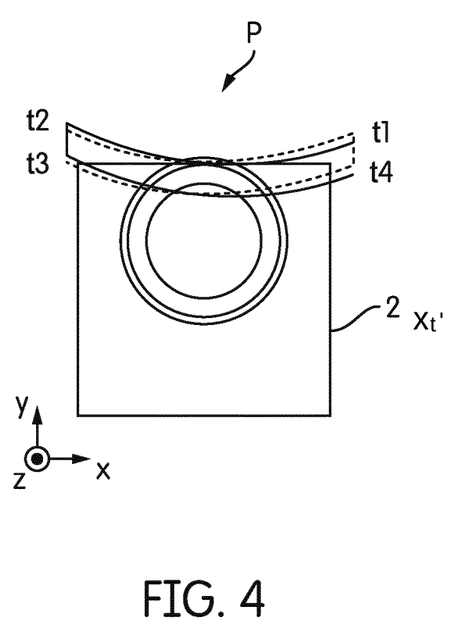
FIG. 4—is a schematic view of the course of the tool paths generated according to an embodiment of the present invention.

FIG. 4 shows a schematic view of the course of the tool paths (P) generated according to an embodiment of the present invention from the top direction of FIG. 2. In this embodiment, the free-form tool paths (P) are generated to machine in curved slices in which the tools (4) are partly moved independently along arc shaped axes (c', c") around respective rotation center (O',O") with respective radii (r', r") and workpiece-infeed along the coupled axis (y). FIG. 4 shows the courses of the generated free-form paths (P) along the arc shaped axis (c', c") of the tools (4) as solid and dashed curved slices, wherein the time points t1 to t4 mark the course of the solid curved slice. Due to kinematic deviations on both machining sides, these free-form paths (P) do not have to be coincident. In this embodiment, the tools (4) traverse the free-form paths (P) in the opposite direction. Alternatively, they can be moved in the same direction. Although this special shape of tool paths (P), as shown in FIG. 4, is comparable to the tool paths calculated in a parametric way, the calculation of these paths is carried out differently. The present method allows to consider the whole 3D geometry of the restoration (1) e.g. to locally adapt the parameters e.g. the path distances of the meanders. If the tools (4) move in opposing direction, collision avoidance can be optionally performed e.g. by a retraction movement, which is an embodiment of the present invention. In this case, shortly before both tools will collide, one of the tools stops its horizontal movement, is lifted into tool axis direction (z' or z") to a collision free position, waits until the other tool has passed, and starts machining at the last original point before the retraction.

Figure 5:
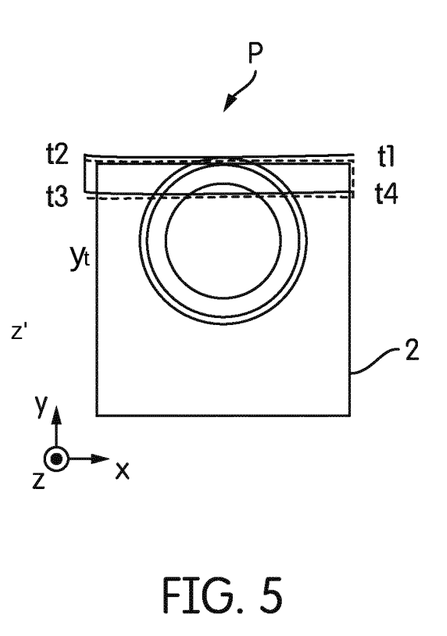
FIG. 5—is a schematic view of the course of the tool paths generated according to another embodiment of the present invention.

FIG. 5 shows a schematic view of the course of the free-form tool paths (P) generated according to an alternative embodiment of the present invention from the top direction of FIG. 2. In this embodiment, the free-form tool paths (P) are generated to machine in straight slices in which the tools (4) are partly moved in conformity with the geometry of the workpiece (2) and workpiece-infeed along the coupled axis (y). FIG. 5 shows the courses of the generated free-form paths (P) as solid and dashed straight slices, wherein the time points t1 to t4 mark the course of the solid straight slice. Due to kinematic deviations on both machining sides, these free-form paths (P) do not have to be coincident. In this embodiment, the dental tools (4) traverse the free-form paths (P) in the opposite direction. Alternatively, they can be moved in the same direction. In contrast to the previously described arc-shaped tool paths, these straight tool paths can machine workpieces (2) with a straight shape with a smaller path length and therefore in less time. These workpiece-adapted tool paths could not be processed simultaneously on a two-spindle machine with arc shaped tool axes by applying prior art methods. For tools (4) moving in opposite direction, the separation of the path into collision free areas can be utilized as collision avoidance, which is an embodiment of the present invention. In this case, each horizontal part of the tool path which crosses the restoration is collision free if the whole tool is covered by the restoration. The tool from the opposing side cannot collide with the covered tool. That is why the tools can be synchronized to pass each other in this collision free area. In an embodiment, the method comprises various strategies of avoiding collision between the tool spindles and the connected machine parts. In a version of this embodiment, in the collision avoidance step the free-form tool paths (P) are separated from each other by disjunctive machining spaces. For collision avoidance, a simple horizontal separation of the dental restoration (1) in FIG. 6B, by a plane would be possible. For other target geometries, however, separation with a free-form surface in more than two areas may also be necessary or useful. Thereafter, the free-form tool paths (P) are generated for a machining side only in the disjunctive machining spaces assigned to them. In another version of this embodiment, in the collision avoidance step, collision-afflicted and collision-free areas are determined along the free-form tool paths (P), and the free-form tool paths (P) are synchronized in such a way that the tool spindle and the collision-relevant machine parts are never moved simultaneously in the associated collision-afflicted areas. Collision-afflicted means that the tools (4) or collision-relevant machine parts can collide in these areas. In another version of this embodiment in the collision avoidance step, a retraction movement along the tool axis (z', z") is performed on one or both tool axes (z', z") to guide them past each other.

Figure 6A:
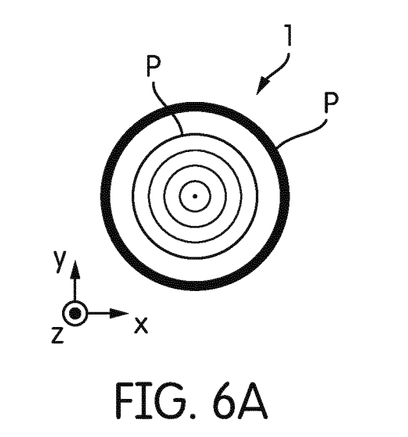
FIG. 6A—is a schematic view of the distribution of the tool paths for the dental restoration of FIG. 2A according to another embodiment of the present invention.
Figure 6B:
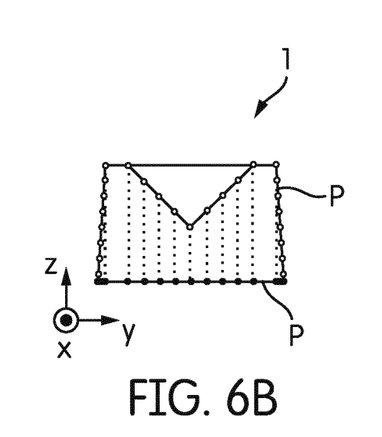
FIG. 6B—is a schematic sectional view of the distribution of the tool paths of FIG. 6A.
Figure 14A:
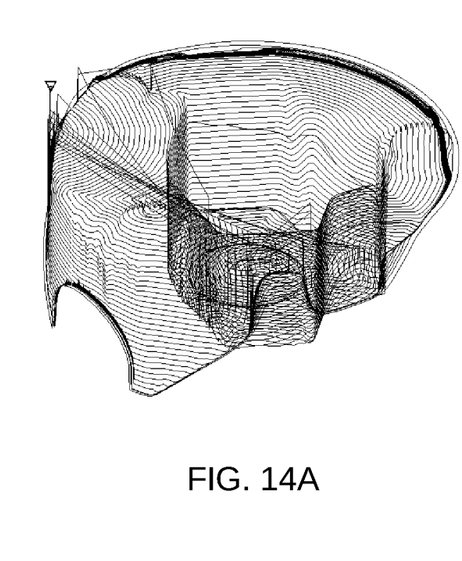
FIG. 14A—shows tool paths generated to cover the surface of an exemplary restoration from top direction with a limitation of the maximal distance between the paths.
Figure 14B:
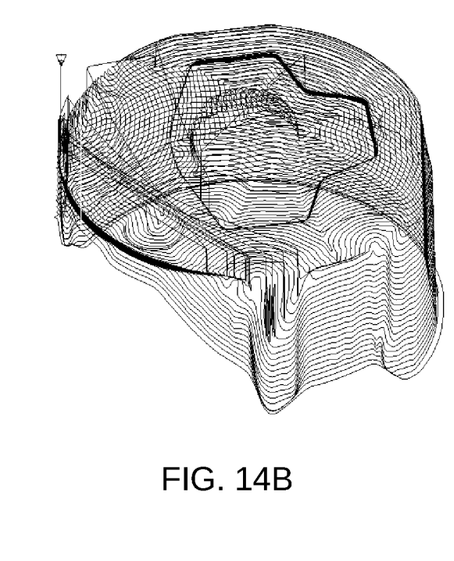
FIG. 14B—shows tool paths generated to cover the surface of an exemplary restoration from bottom direction with the same method used for the paths in FIG. 14A, which can be machined simultaneously to those paths.

In an embodiment, the free-form tool paths (P) are generated for the target geometry either for pre-finishing or finishing. The free-form tool paths (P) are generated to machine on or near the surface, i.e., with an offset to the surface of the dental restoration (1) with static or dynamic boundary conditions on the distance of adjacent tool paths (P) with respect to both tools (4). The free-form tool paths (P) are distributed on or near the surface of the target geometry at a distance to be determined. Different strategies for the distance can be used based on the properties of the tool paths (P) or the tools (4). A preferable strategy is, for example, to limit the maximum distance that the tool paths (P) may have in order to guarantee uniform coverage of the surface. In simultaneous two-sided machining, both sides preferably maintain this maximum distance to the neighboring tool path (P). FIG. 6A shows a schematic view of the distribution of the tool paths (P) for the target geometry of FIG. 2A according to another embodiment. FIG. 6B shows a schematic sectional view of the distribution of the tool paths (P) of FIG. 6A. The hollow circles in FIG. 6B show the tool paths (P) on the machining side corresponding to the top of the dental restoration (1) in FIG. 2A. The filled circles show the tool paths (P) on the machining side corresponding to the bottom of the dental restoration (1) in FIG. 2A. The tool paths (P) were generated here with the strategy of having a predetermined maximum distance. As shown in FIG. 6B by the dashed lines, the tool path (p) positions on both machining sides lie perfectly on top of each other as much as possible. As shown in FIG. 6A, the outer bold circle depicts the dense tool paths (P) lying on the highly steep outer surface of the dental restoration (1) which also meet the maximum distance strategy. A more complex object processed with tool paths in such a way is shown in perspective views for the first tool (4) in FIG. 14A and for the second tool (4) in FIG. 14B. The tool paths (P) which are shown in the FIGS. 14A-B can be separated into closed loops and these loops can be synchronized in the same direction or in opposing direction for both tools, which is relevant for the collision avoidance as a part of the present invention. If the paths (P) are synchronized in the same direction, the tools (4) might be pointing at each other all time and must be separated into disjunctive regions regarding the immersion depth in direction of the tool axes (z', z"). Or alternatively, if the paths (P) are synchronized in opposing direction, the tools (4) pass each other only at specific points. In this case it must be e.g. ensured that these points are collision free. Although this or similar path strategies are state-of-the-art for single spindle machining, also known as constant cusp path generation, a simultaneous machining to save processing time cannot be carried out with prior art methods.

Figure 12A:
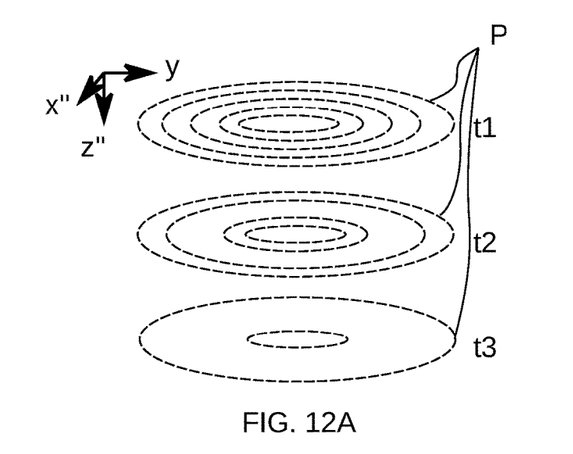
FIG. 12A—shows tool paths on constant levels, where the different levels are machined at different points in time.
Figure 12B:
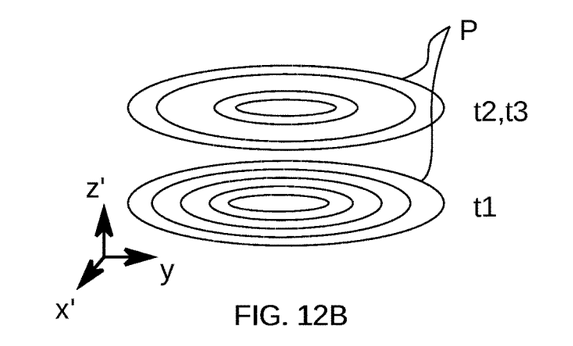
FIG. 12B—shows tool paths on constant levels which can be machined simultaneously to the tool paths shown in FIG. 12A from the opposite site, where the levels at each point in time can be varied between both sides.

In an embodiment, the free-form tool paths (P) are generated to machine along contours on constant levels with respect to both tool axes (z', z"). As shown in FIG. 12A-B, the free-form tool paths (P) are on constant levels. The different levels of the tool axes (z', z") must not necessarily be synchronized in time, as indicated by the different time points t1-t3 in FIG. 12A and constant level tool paths for single spindle machines are state-of-the-art. However, constant level free-form tool paths cannot be simultaneously machined with prior art methods.

According to the method of the present invention, with these simultaneously machined constant level tool paths (P), the machining time is reduced compared to prior art methods.

Figure 13:
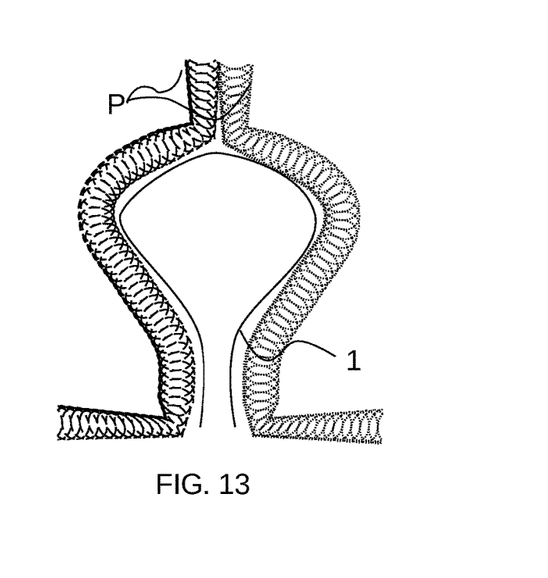
FIG. 13—shows trochoidal paths surrounding the restoration, which can be processed with different tools from opposing sides simultaneously, where the different tools are indicated by the dashed and dotted lines.

In an embodiment, the free-form tool paths (P) are generated to simultaneously machine along trochoidal paths following the shape of a restoration (1) as shown in FIG. 13. Trochoidal paths for machining cannot be machined simultaneously on a two-spindle machine with prior art methods. The trochoidal paths can be determined as an overlaid motion with constant amplitude or varying amplitude.

The invention claimed is:

1. A computer-implemented method comprising:
   planning of shapes of free-form tool paths for simultaneous two-sided machining of a dental restoration having an individual free-form target geometry from a workpiece by using a dental tool machine that comprises at least two tool spindles each having at least one tool arranged on a different side of the workpiece which is simultaneously movable along a workpiece axis relative to the at least two tool spindles and thereby imposing a kinematic axis coupling, further comprising:
   computing transformations of the free-form target geometry with respect to each machining side, into a common space in which coordinates along the workpiece axis for both at least one tool of the at least two tool spindles are transformed into a common coupling parameter;
   generating dependent on these transformations the shapes of the free-form tool paths in which the common coupling parameter is identical in time for all participating of the at least two tool spindles that are driven simultaneously; and
   avoiding collision between the at least two tool spindles and connected machine parts when the at least two tool spindles move in an opposite direction or in a same direction, wherein with avoiding collision, collision-afflicted areas and collision-free areas are determined along the free-form tool paths, and the free-form tool paths are synchronized in such a way that collision-relevant of the at least two tool spindles and the connected machine parts are never moved simultaneously in the collision-afflicted areas.

2. The method according to claim 1, further comprising: using a calibration of the dental tool machine for the transformations, responsive to a deviation of a coupled axis from a reference position/alignment exceeding a desired accuracy or responsive to kinematic settings of at least one tool spindle of the at least two tool spindles is shifted or intentionally modified with respect to that of another tool spindle more than a desired accuracy.

3. The method according to claim 1, wherein the free-form tool paths are generated to machine in slices in which the at least two tool spindles are partly moved independently along arc shaped axes around respective rotation centers with respective radii and workpiece infeed along a coupled axis.

4. The method according to claim 1, wherein the free-form tool paths are generated to machine on or near a surface of the dental restoration with static or dynamic boundary conditions on a distance of adjacent tool paths with respect to both tools.

5. The method according to claim 1, wherein the free-form tool paths are generated to simultaneously machine along trochoidal paths.

6. The method according to claim 1, wherein the free-form tool paths are generated to machine along contours on constant levels with respect to both tool axes.

7. The method according to claim 1, wherein with avoiding collision, the free-form tool paths are separated from each other by disjunctive machining spaces.

8. The method according to claim 1, wherein with avoiding collision a retraction movement along a tool axis is performed on one or both tool axes to guide them past each other.

9. A dental machining system comprising:
   a dental tool machine comprising; and
   a control means adapted to perform a method comprising;
   planning of shapes of free-form tool paths for simultaneous two-sided machining of a dental restoration having an individual free-form target geometry from a workpiece by using the dental tool machine that comprises at least two tool spindles each having at least one tool arranged on a different side of the workpiece which is simultaneously movable along a workpiece axis relative to the at least two tool spindles and thereby imposing a kinematic axis coupling, further comprising:
   computing transformations of the free-form target geometry with respect to each machining side, into a common space in which coordinates along the workpiece axis for both at least one tool of the at least two tool spindles are transformed into a common coupling parameter;
   driving all participating of the at least two tool spindles simultaneously dependent on the transformations and based upon the shapes of free-form tool paths with the common coupling parameter being identical for all the participating tool spindles at each point in time; and avoiding collision between the at least two tool spindles and connected machine parts when the at least two tool spindles move in an opposite direction or in a same direction, wherein with avoiding collision, collision-afflicted areas and collision-free areas are determined along the free-form tool paths, and the free-form tool paths are synchronized in such a way that collision-relevant of the at least two tool spindles and the connected machine parts are never moved simultaneously in the collision-afflicted areas.

10. A non-transitory computer-readable storage medium storing a program which, when executed by a computer system, causes the computer system to perform a method comprising:

planning of shapes of free-form tool paths for simultaneous two-sided machining of a dental restoration having an individual free-form target geometry from a workpiece by using a dental tool machine that comprises at least two tool spindles each having at least one tool arranged on a different side of the workpiece which is simultaneously movable along a workpiece axis relative to the at least two tool spindles and thereby imposing a kinematic axis coupling, further comprising:

computing transformations of the free-form target geometry with respect to each machining side, into a common space in which coordinates along the workpiece axis for both at least one tool of the at least two tool spindles are transformed into a common coupling parameter;

driving all participating of the at least two tool spindles simultaneously dependent on the transformations and based upon the shapes of free-form tool paths with the common coupling parameter being identical for all the participating tool spindles at each point in time; and avoiding collision between the at least two tool spindles and connected machine parts when the at least two tool spindles move in an opposite direction or in a same direction, wherein with avoiding collision, collision-afflicted areas and collision-free areas are determined along the free-form tool paths, and the free-form tool paths are synchronized in such a way that collision-relevant of the at least two tool spindles and the connected machine parts are never moved simultaneously in the collision-afflicted areas.

* * * * *